though in the United States this name is more often used for the front or shoulder part, the so-called picnic. Therefore, in the following description, for reasons of brevity, the product to be treated is called "ham" and it should be understood that the same is true also for "picnic."

United States Patent [19]
Michels et al.

[11] 3,775,134
[45] Nov. 27, 1973

[54] PROCESS FOR PRESERVING HAMS AND PICNICS

[75] Inventors: Paul W. Michels, Plasmolen-Mook; Arnold Heun, Oosterbeek, both of Netherlands

[73] Assignee: Homburg N.V., Cuyk, Netherlands

[22] Filed: June 20, 1969

[21] Appl. No.: 835,235

[30] Foreign Application Priority Data
June 28, 1968 Netherlands....................... 6809250

[52] U.S. Cl................................. 426/281, 426/392
[51] Int. Cl. ......................... A23b 1/00, A23b 1/02
[58] Field of Search..................... 99/159, 187, 254, 99/255, 256, 257

[56] References Cited
UNITED STATES PATENTS
3,076,713   2/1963   Maas.................................. 99/159 X

*Primary Examiner*—Hyman Lord
*Attorney*—Browdy and Neimark

[57] ABSTRACT

A process for preserving hams and picnics, wherein brine is injected into hams or picnics in the deboned or non-deboned state. After the brine injection the hams or picnics are placed in a container and subjected therein to a continuous or intermittent agitating movement. Finally they are canned in pickled and deboned condition.

11 Claims, No Drawings

PROCESS FOR PRESERVING HAMS AND PICNICS

This invention relates to a process for preserving hams and pork shoulders (hereinafter called "picnics"), wherein brine is injected into the hams or picnics which may have been deboned already or are deboned thereafter, and the hams or picnics are canned in deboned and pickled condition and to hams and picnics so processed.

Many processes of the above class have been described in patent literature, and all of these have in common that they show the disadvantage that an excess of brine is used which is removed again in a later stage of the process. This also removes some meat protein from the product which at that time is not yet completely germ-free, because it is extracted into the brine solution. Accordingly, the re-use of this solution is not entirely safe. More specifically, the following patents may be mentioned in this respect:

German Pat. No. 667,930. According to this patent the meat is centrifuged after injection of the brine, and the liquid pressed out of the meat in this operation, and containing a low salt content, is replenished and re-used. It should be mentioned in this respect that for the centrifuging treatment the pieces of meat or the like have to be packed in nettings or similar enclosures, which is a rather cumbersome labour. In practice this process has not found acceptance; German Pat. No. 941,949 which will be discussed hereinafter calls the success of the above process is questionable.

This German Pat. No. 941,949 also seeks a solution to the problem of removing again the excess of brine used in the injection treatment, and simultaneously arriving at a thorough distribution of the brine throughout the meat. To this end it is proposed to expose the meat to a subatmospheric pressure in a vacuum kettle after the injection of the brine, whilst under the influence of the air of the atmosphere, a movable bottom is pressed against it. This process has been tried in practice by the present inventors, but it did not yield a well pickled product, whilst moreover the loading and unloading of the vacuum kettle is rather labor-consuming again.

A similar vacuum treatment is proposed in German Pat. No 816,344, according to which, however, the meat is not pressed with a movable bottom, but is kept in constant movement.

Still another variation is found in German Pat. No. 935,763. This patent proposes to subject the meat first to the injection treatment, and to place it then in a bath of brine. In this bath it is exposed to acoustic vibrations. It will be clear that in this process the meat is exposed to osmotic and bacteriological actions which are difficult to control.

According to French Pat. No. 1,465,421 the meat, after injection of the brine, is also placed in a bath of brine. In this bath it is exposed to a rotating movement.

U.S. Pat. No. 3,006,767 discloses a complicated apparatus, wherein meat which has previously been injected with brine can be treated in order to distribute the brine throughout the meat and to press out the excess of brine.

In actual practice methods are used which are related to some of the processes discussed hereinabove. These can be summarized as follows:

1a. Hams and picnics are treated with a brine of usual composition by injection into the vein and/or directly into the meat, stored in a brine of usual composition for one or more days, and then stored without brine at a low temperature, e.g. 4°–8°C, for one or more days; thereafter the hams or picnics are deboned and cut, packed in cans and made non-perishable to a greater or lesser degree by heating.

1b. Hams and picnics are processed as in 1a, but before canning they are placed one or more times in a container which is brought into a rotating centrifugal movement.

2a. Hams and picnics are deboned and cut, and then brine is injected with a brine injector into the meat, which optionally has been provided with a permeable enclosure (e.g. nettings); thereafter, the product may or may not be stored in brine, for example for 1 day (or shorter or longer), and then the product is canned and made non-perishable for a shorter or longer time by heating.

2b. Hams and picnics are processed as in 2a, but before canning they are placed one or more times into a container which is brought into a rotating centrifugal movement.

The advantage of method 1b over 1a and of method 2b over 2a is that it decreases the quantity of separated moisture, called "yield", when the ham or picnic is heated in a can or the like, whilst all properties of a so processed ham or picnic are improved. All abovementioned methods have, however, the common disadvantage that they are cumbersome, and require many processing stages and much time. Moreover, the properties of the hams or picnics obtained according to all the above-described methods, e.g. the already mentioned yield, as well as the firmness and the desired suiting of the shape to that of the can, are not satisfactory in all respects. Furthermore, also these methods which are used in actual practice show the drawback that an excess of brine is injected which during the aftertreatment leaves the meat again and carries along meat protein.

An object of this invention is to provide a process for preserving hams and picnics which substantially overcomes the above disadvantages and drawbacks, and yields improved products having desirable properties.

A further object is to provide the above improvements with a process which is much simpler than the processes used up till now in actual practice.

Other objects, features and advantages of this invention will become apparent from the following description.

Surprisingly, it has now been found that hams and picnics of outstanding properties are obtained, if one uses a modification of the known processes, and that thereby the pickling process can be controlled so well that during the aftertreatment no or substantially no solution is removed from the meat anymore.

This invention provides a process for preserving hams and picnics, comprising injecting brine into the hams or picnics, which may have been deboned previously, and canning them in deboned and pickled state, said process being characterized by the fact that after the brine injection and before the canning, a plurality of the injected hams or picnics are stored in a container, and subjected therein to a continuous or intermitting stirring movement at atmospheric pressure.

The stirring, which can be carried out with a conventional stirring device or the like, need not be continuous, but can also be intermittent, as mentioned already, and in that case it can be carried out at regular or irregular time intervals. The time of this stirring treatment can be restricted to 24 hours. This means that about 24 hours after the injection of the brine, a ham or picnic can be canned already, as a result of the process according to the present invention.

According to one embodiment the hams and picnics are first deboned and cut; then brine is injected with a brine injector, and subsequently the hams or picnics are placed in a container, containing no brine, wherein they are moved with a turning stirring device until the hams are cured and pliable for cans. According to another embodiment the hams or picnics are first treated with brine by injection into a vein, thereafter deboned and cut, and then placed into a container, and subjected to the abovementioned treatment.

Compared with the known methods, as discussed sub 1a, 1b, 2a and 2b, the present process shows several advantages:

a. The ham or picnic prepared according to the present process shows a lower yield or exudation, and the pliability of the ham or picnic suits itself better to assuming the shape of the can. Thus, hams or picnics which are packed in square cans also assume a square shape adapted to the can. This means that when slices are cut from a ham or picnic prepared according to the present process, almost all slices will assume the desired square shape. This is of particular importance, because a very large part of the hams and picnics packed in square cans is cut into slices.

b. The so prepared ham or picnic has a better firmness; each slice per se shows an improved cohesion, and disintegrates to a lesser extent. The slices are more compact and firm.

c. The number of processing stages decreases by 20 to 33 percent.

d. The overall processing room which is necessary has become considerably smaller, because the room, wherein the hams or picnics are temporarily stored without brine is now also used as processing department.

e. The conveyance of raw materials has decreased considerably.

f. The total investments in machines and conveyance equipment is lower.

g. The dwelling time in the plant decreases so that the money loss due to stockpiling is decreased.

h. The uniformity of the final product is improved and the quality is more constant.

i. The use of brine decreases by about 10 percent.

j. Because in the process of the invention substantially no brine is lost from the treated hams and picnics by dripping out or the like, which brine also contains a small part of the valuable meat protein, more protein is present in the hams and picnics processed according to this invention.

The following example is for the purpose of illustrating the process of this invention, it being understood that the invention is not restricted to materials and conditions used in said example.

EXAMPLE 600 kg of deboned and cut hams or picnics are injected with 15 percent of brine with the aid of a brine injector. Thereafter, they are placed into a container having a length and width of 95 cm each and a height of 85 cm. In this container they are stirred for 5 minutes per hour with the aid of a stirring device of such a construction that the entire contents of the container can be moved.

After about 24 hours the hams or picnics are quite pliable and are then removed from the container, canned and further processed in the usual way.

What I claim is:

1. A process for preserving hams or picnics consisting of the steps of (a) injecting substantially the required amount of brine for pickling into the hams or picnics (b) storing a plurality of the hams or picnics after said injection in a container without additional brine and at atmospheric pressure, and at the same time subjecting them therein to an at least intermittent stirring movement of 5–60 minutes for each hour of storing until pickled and pliable and (c) canning the so treated hams.

2. The process of claim 1, wherein said movement in step *b* is continuous.

3. The process of claim 1, wherein said movement in step *b* is intermittent.

4. The process of claim 1, wherein the storing is for approximately 24 hours.

5. The process of claim 3, wherein the stirring is for approximately 5 minutes of each hour of storing.

6. The process of claim 5, wherein the storing is for approximately 24 hours.

7. A process for preserving hams according to claim 1, wherein the hams are deboned after step *a* and before step *b*.

8. The process of claim 1, wherein the hams or picnics are deboned before step *a*.

9. The process of claim 8, wherein the stirring is intermittent.

10. The process of claim 9, wherein the stirring is for approximately 5 minutes of each hour of storing and the storing is for approximately 24 hours.

11. A process for treating a ham or picnic, consisting of the steps of
   a. injecting substantially the required amount of brine, on the order of about 15 percent, into said ham or picnic;
   b. placing said brine injected ham or picnic into a container without additional brine and at atmospheric pressure, and pickling said ham or picnic for a period on the order of about 24 hours while simultaneously stirring for approximately 5 – 60 minutes for each hour of pickling; and
   c. removing said brine injected ham or picnic from said container after it has become pickled and pliable, and canning the so treated ham or picnic.

* * * * *